United States Patent [19]
Bassick

[11] 3,776,474
[45] Dec. 4, 1973

[54] CONTROLLED ATMOSPHERE-SOLID WASTE DISPOSAL SYSTEM

[76] Inventor: Joseph Bassick, P.O. Box 11, Wallace, Idaho 83873

[22] Filed: Oct. 29, 1971

[21] Appl. No.: 193,714

[52] U.S. Cl. .................. 241/23, 241/24, 241/65, 241/78
[51] Int. Cl. .................................... B02c 21/00
[58] Field of Search .............. 241/23, 24, 25, 65, 241/76, 78

[56] References Cited
UNITED STATES PATENTS

| | | | |
|---|---|---|---|
| 3,635,409 | 1/1972 | Brewer | 241/76 X |
| 240,581 | 4/1881 | Edwards | 241/65 X |
| 1,735,397 | 11/1929 | Hiller | 241/23 |
| 3,557,685 | 1/1971 | Schroering | 241/24 |

Primary Examiner—Granville Y. Custer, Jr.
Attorney—Harris C. Lockwood

[57] ABSTRACT

The method of this invention comprises the steps of sorting processable and nonpocessable materials from waste materials, sorting ferrous materials from processable materials, shredding processable materials, evaporating and dehydrating processable materials at substantially high temperatures while avoiding burning or incineration of the materials, and pulverizing or grinding the materials into a spreadable grain-size fertilizer and soil conditioner product. The apparatus includes a primary sorting table, a magnetic sorting means for ferrous materials, a material shredder, a substantially high-temperature, enclosed, controlled atmosphere evaporator-dehydrator, and a mixer-grinder.

2 Claims, 7 Drawing Figures

JOSEPH BASSICK    INVENTOR.

PATENTED DEC 4 1973 3,776,474

JOSEPH BASSICK INVENTOR

BY

JOSEPH BASSICK INVENTOR.

BY John W Krafft 3,776,474

JOSEPH BASSICK INVENTOR.

CONTROLLED ATMOSPHERE-SOLID WASTE DISPOSAL SYSTEM

FIELD OF INVENTION

The present invention relates to a controlled atmosphere-solid waste disposal system, and more particularly to a controlled atmosphere-solid waste disposal system operable to produce a spreadable grain-size fertilizer and soil conditioner from municipal garbage refuse.

BRIEF DESCRIPTION OF THE PRIOR ART

A large portion of the garbage and waste materials acquired during each day in households, wheteher city or urban, is normally disposed of through the use of waste or garbage pick-up means, and is taken to disposal sites, such as dumps and the like, which are unhealthy. At the dumps, the garbage and waste material is usually disposed of by land fill operation, or by incineration. Such methods provide substantial ecological hazards, both to the dumping area and to its environs. Land fill operations require constant attention. In leveling and burying of collected waste material in such operations, the waste material is buried under the overburden created by the land fill operation, so that the material, when decomposed, is usually not utilized in any manner. In an effort to avoid such disposal areas and to obtain an end product which may be readily utilized and become a saleable item, various and sundry attempts have been directed to devising both process and apparatus for the composting or converting, both organic and inorganic, materials to humus or spreadable grain-size fertilizers and soil conditioners. Efforts in composting such materials to create humus have been directed largely to the introduction of microorganisms into the waste material, so that it may decompose. In such processes a long and extended period of time is required to completely effect decomposition of the waste material to produce an end product satisfactory for soil nutriment of humus. In some instances an anaerobic bacterial process has been employed, which will produce a satisfactory and marketable material. However, such a process is one which, during the composting of the waste material, produces noxious odors and offensive gas products which emanate into the atmosphere. In an effort to avoid the obnoxious gas resulting from the anaerobic process, numerous efforts have been directed to the composting of waste material by an anerobic bacterial digesting process which permits both refuse and garbage, that have been delivered to the composting apparatus, to be subjected to an anaerobic thermophilic fermentation. This latter process does avoid degeneration and omission of obnoxious gasses, due to the fact that air is directed over the refuse material. Notwithstanding unusually long periods of time to effect the composting of the material, in many instances, certain layers of strata of the material are not completely composted due to lack of aeration. Accordingly, it is an object of the present invention to provide means of producing spreadable grain-size fertilizers and soil conditioners from municipal garbage and refuse by means which provide controlled atmoshphere decomposition of the material in a very short period of time. A further object of the present invention is to provide means of disposal of all waste, including both organic and inorganic materials.

These and other objects shall become apparent from the description following, it being understood that modifications may be made without affecting the teachings of the invention here set out.

SUMMARY OF THE INVENTION

Generally, the method of this invention comprises the steps of sorting processable and nonprocessable materials from waste materials, sorting ferrous materials from processable materials, shredding processable material, evaporating and dehydrating processable materials at substantially high temperatures while avoiding burning or incineration of the materials, and pulverizing or grinding the materials into a spreadable grain-size fertilizer and soil conditioner product. The apparatus includes a primary sorting table, a magnetic sorting means for ferrous materials, a material shredder, a substantially high-temperature, enclosed, controlled atmosphere evaporator-dehydrator, and a mixer-grinder.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
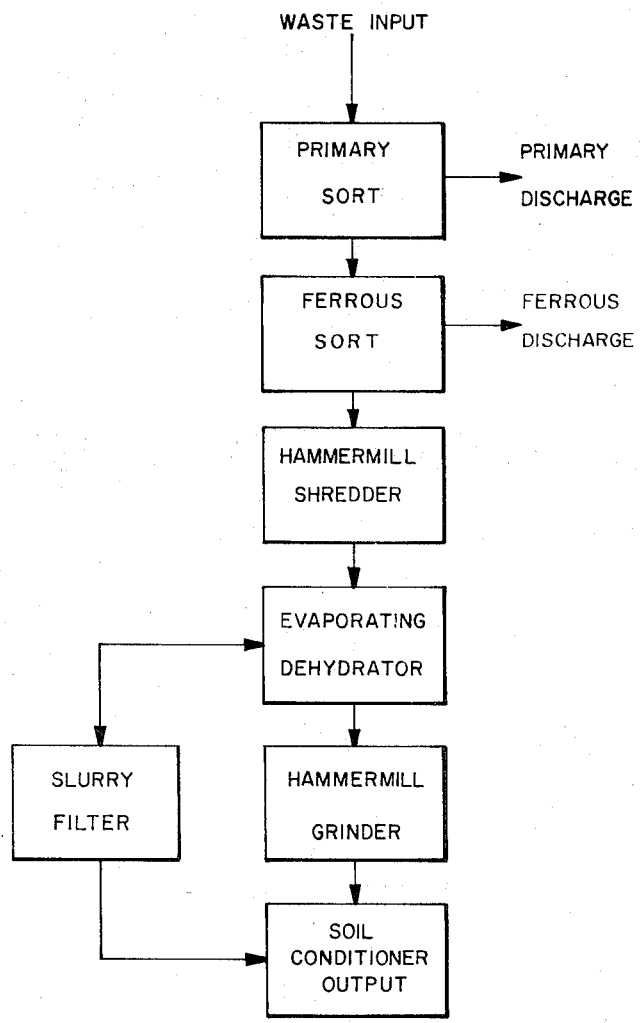
FIG. 1 is a flow chart of the steps of the process taught by the present invention.

Referring now to the drawings and more particularly to the FIG. 1 which shows to advantage the several steps of the method of converting waste taught by the present invention. It may be observed from the drawings that waste products are first segregated as to objects and materials which may and may not likely be compatible for processing. Objects and materials which may not be compatible are those of large size, and materials which, by their inherent characteristics, may not be changed in form, such as rubber or similar synthetics. Objects and materials permitted to enter the apparatus are thereafter sorted as to ferrous materials, as hereinafter later described. The remaining material waste is chopped or shredded, and conveyed to an evaporating-dehydrating operation. In practice, it has been found to advantage to avoid oxidation or incineration, since products resulting from such an operation are usually high in alkali and acid elements, which are generally injurious to the soil. Hence, it is to advantage to remove moisture, condensate, vapors, and the like from the waste material, and, at the same time, preserve the fiber structure of the material, as hereinafter later more fully taught in conjunction with the disclosure of selected apparatus described.

The material is thereafter conveyed from the evaporating-dehydrating stage to be pulverized or ground into small particles which may be readily accepted into soils. To the ground waste products are added semisolid slurry-like contaminants which are inherently carried off with condensates from the evaporating-dehydrating operation.

Figure 2:
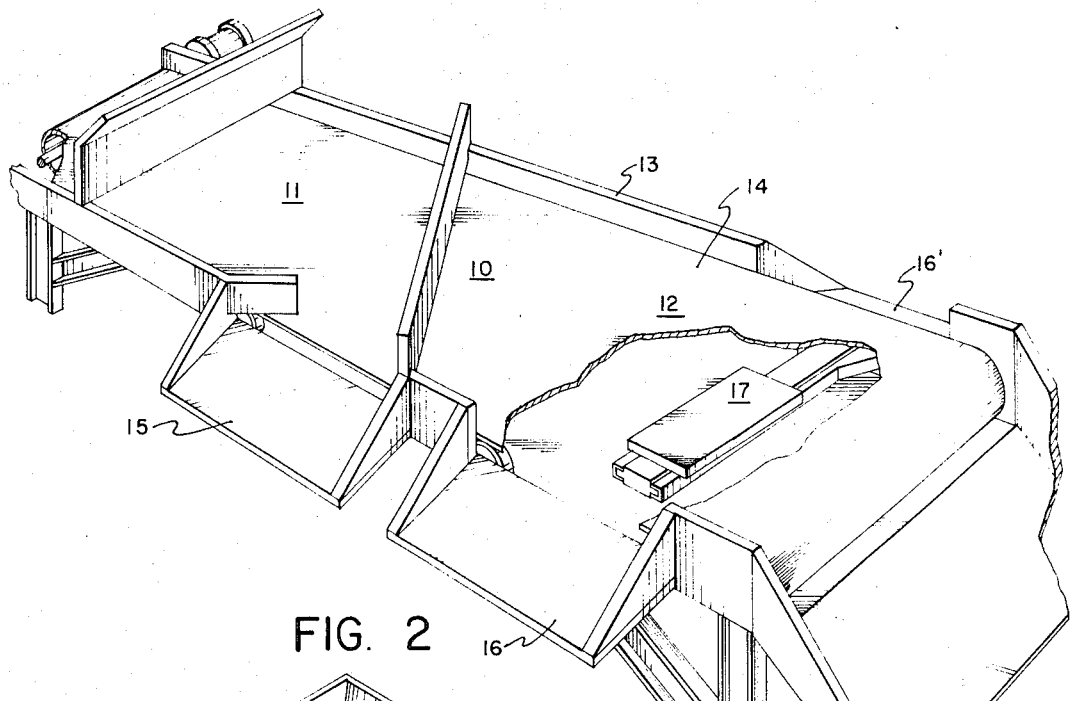
FIG. 2 is a perspective view of the combination primary sorting table and ferrous sorting table of the invention.

Referring now to the FIG. 2, a sorting table generally identified by the numeral 10 is shown. The sorting table 10 may be conveniently divided into two portions relating to the sequence of operations, namely primary sort portion 11 and ferrous sort portion 12. The table 10 comprises a framework 13 and a commonly known belt conveyor 14. Waste material is dumped onto the conveyor 14 in the primary sort portion 11. The portion 11 includes an exitway 15 through which objects and materials which may not likely be compatible for processing may be manually extracted or segregated from the waste material mass. Other material is conducted by the conveyor 14 into the ferrous sort portion 12. The portion 12 is provided with a pair of opposing exitways 16 and 16' on opposite terminal sides of the portion 12. An electromagnet assembly 17 is mounted on the framework 13 below the belt conveyor 14, and is caused to drivingly oscillate transversely of the conveyor 14, coextensive with the width thereof, by a suitable driving means. Hence, ferrous materials in the waste material mass tend to be conducted toward the repective exitways 16 and 16', while the remaining portion of the waste material mass is carried by the conveyor 14 toward the terminal end of the table 10. It is to be understood that any of a variety of magnet and sorting assemblies, commonly known, may be variously employed to accomplished the required sorting functions.

Figure 3:
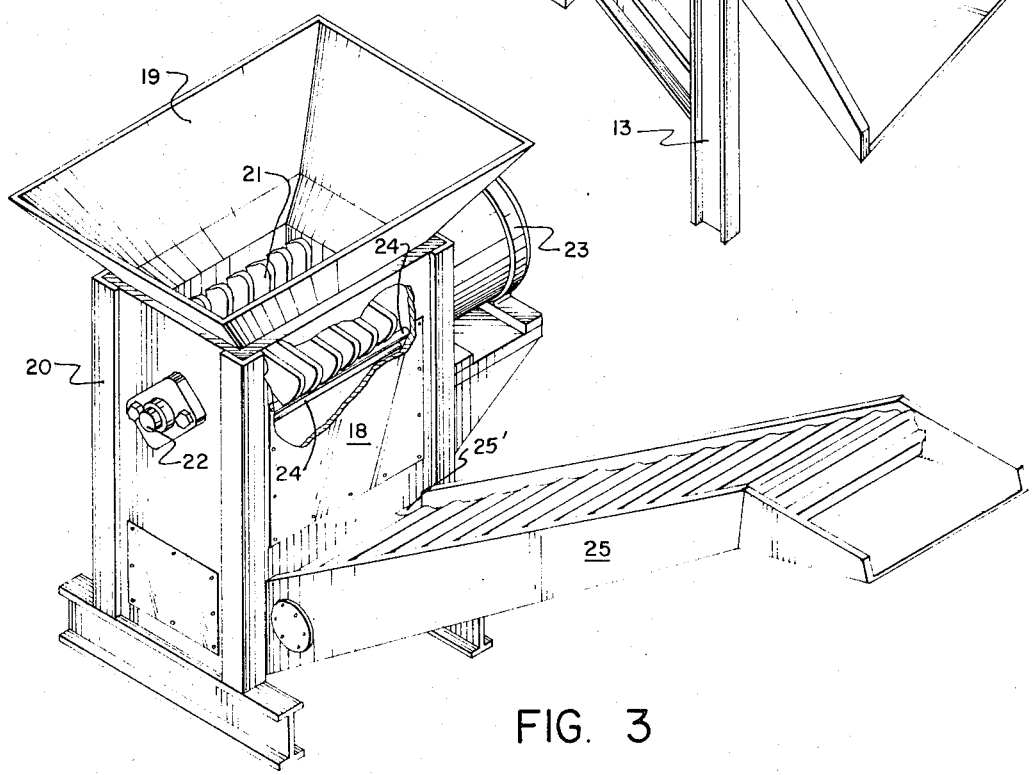
FIG. 3 is a perspective view of a shredder assembly adapted for use with the process of this invention.

Referring now to the FIG. 3, a hammermill shredder 18 is advantageously shown. In practice, it has been found that commonly known cone crushers, mechanical shredders, and the like may be used with equal effectiveness as the shredder 18. Waste material from the sorting table 10 is discharged into a hopper 19 provided on the shredder 18. The shredder 18 comprises the hopper 19 carried on a housing 20; a multiplicity of hammer-like blades 21 mounted on a shaft 22 journaled for rotation in the housing 20, and driven by a suitable means, such as motor 23; a multiplicity of fixed rods 24 spaced apart at intervals and circumferentially adjacent the lowermost terminal edge of the blades 21; and a conveyor assembly 25 juxtapositioned to an exitway 25' at the lowermost portion of the housing 20. Waste material in the hopper 19 is picked up by the blades 21, and driven with substantial force to impinge the rods 24 in response to the rotation of the blades 21 on the shaft 22. At the same time, the blades 21 tend to shred the waste material. When the material is shredded to a size smaller than the spaced openings between the rods 24, the material may pass therethrough and onto the conveyor assembly 25 to be carried out of the shredder 18. It is to be understood that glass, nonferrous metals, paper, and the like are inclined in the waste material mass.

Figure 4:
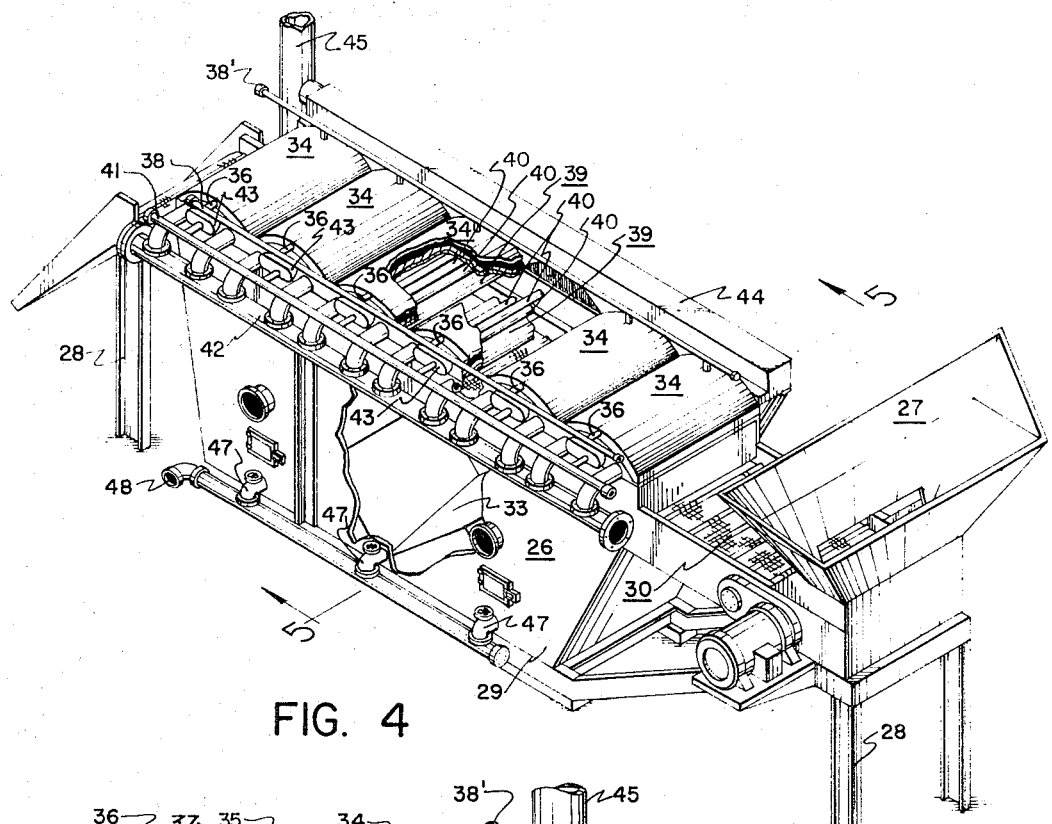
FIG. 4 is a perspective view of the controlled atmosphere evaporator-dehydrator of the invention.
Figure 5:
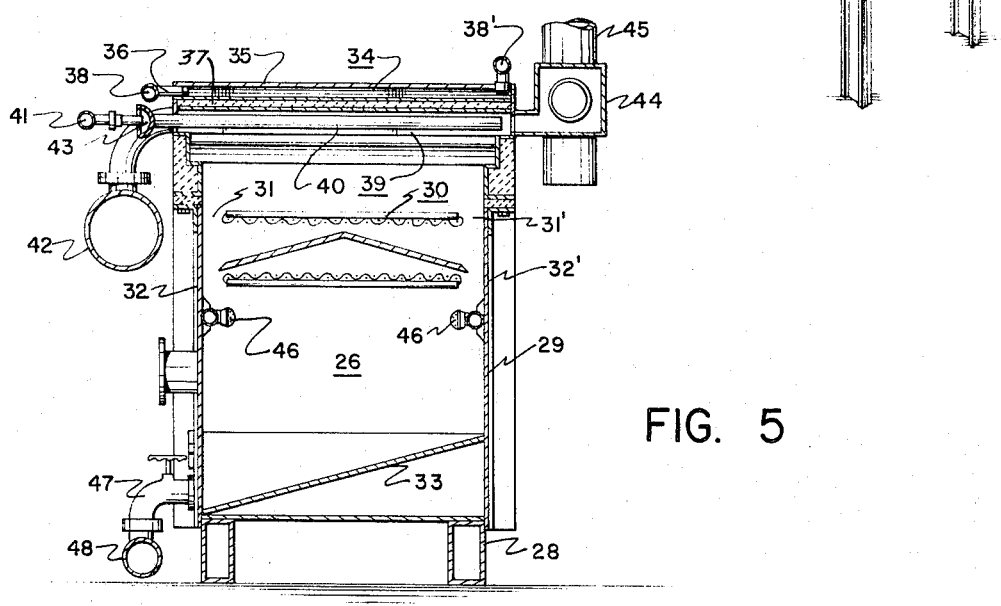
FIG. 5 is a cross-sectional elevational view of the controlled atmosphere evaporator-dehydrator of the invention taken substantially along the lines 5—5 of the FIG. 4.

The evaporator-dehydrator of the present invention is shown to advantage in the FIGS. 4 and 5, and is generally identified by the numeral 26. The evaporator-dehydrator 26 of the present invention is similar to a cynabar reduction furnace used and employed in the production of mercury, modified, however, to the needs and requirements of the process of this invention. The evaporator-dehydrator 26 is provided with a feeder assembly 27 adapted to receive material from the conveyor assembly 25 of the shredder 18. The evaporator-dehydrator 26 is carried by a frame 28 comprising a substantially table-like structure supported by legs. The evaporator-dehydrator 26 includes a substantially enclosed housing 29 mounted on the frame 28. A conveyor 30 is rectilinearly disposed in the housing 29 and is coextensive in length therewith. The conveyor 30 is, however, transversely narrower than the housing 29 so that the openings 31 and 31' are provided between the upstanding sidewalls 32 and 32' of the housing 29 and the opposing terminal sides of the conveyor 30, as shown to advantage in the FIG. 5. The conveyor 30 is distally disposed above the bottom wall 33 of the housing 29. In practice it has been found to advantage to provide a belt portion of the conveyor 30, having a substantially open mesh to facilitate the passage of air therethrough.

The uppermost wall of the housing 29 includes a muliplicity of convex cooling chamber-reflector plate assemblies 34 transversely disposed to the sidewalls of the housing 29. The assemblies 34 include a jacket-like cover 35 enclosing a plurality of cold water pipes 36 and a convex insulated wall 37. Cold water under pressure from a suitable source is supplied through a conduit 38 to pipes 36, and discharged through a conduit 38' on the opposite side of pipes 36. Hence, cold water is circulated through the cooling chamber-reflector assembly 34 to cool the assembly 34. It has been found to advantage to provide a polished reflection surface on the lowermost portion of the walls 37 to tend to reflect heat downwardly toward the conveyor assembly 30, as hereinafter described.

A heating assembly 39 is provided between the assembly 34 and the conveyor assembly 30. The heating assembly 39 comprises a multiplicity of encapsuled fuel burners 40, having suitable fuel under pressure supplied through a header 41 and combustion air supplied through a conduit 42 to respective combustion manifolds 43; an exhaust flue 44 connected to the respective burners 40; and stack 45 through which the products of combustion may be exhausted.

The lower portion of the housing 29 is provided with a plurality of pairs of water misting heads 46 disposed in the housing below the conveyor assembly 30, as shown to advantage in the FIG. 5. It may be observed that the bottom wall 33 is transversely inclined upwardly from the sidewall 32. Condensate outlet 47 is provided in the sidewall 32 adjacent the lowermost intersection of the bottom wall 33 and the sidewall 32. It has been found to advantage to provide a multiplicity of rectilinearly spaced V-shaped sections in the bottom, shown to advantage in the FIG. 4, so that condensate may be conducted more readily to the condensate outlets 47 in each of two directions, i.e. both rectilinearly and transversely.

In operation, heat within the temperature range of 400 to 1300 degrees centigrade is directed from heating assembly 39 by the cooling chamber-reflector plate assembly 34 toward the conveyor assembly 30 and onto waste material thereon. Such amounts of heat tend to cause the waste material to decompose and to drive moisture therefrom. The mist discharge by the misting heads 46 tends to cause moisture and vapors from the waste material to condense and fall between the openings 31 and 31' and to collect on the upstanding sidewalls 32 and 32', to be collected in the bottom wall 33 and carried off through condensate outlets 47. It has been found in practice that waste material under such high temperatures tends not to burn or incinerate because of high ambient moisture content. It has also been found that the condensate in the housing tends to carry with it a substantial quantity of particulate material, and it is to advantage to provide a collector conduit 48 in communication with the condensate outlets 47 and a filter assembly 49, shown to advantage in FIG. 6 and hereinafter later more fully described. Material carried through the evaporator-dehydrator assembly 26 by the conveyor assembly 30 tends to be dry, brittle, and crystaline in character, which may be ground or shredded as hereinafter later disclosed.

Figure 6:
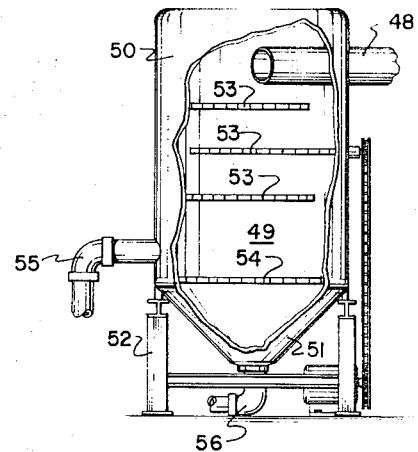
FIG. 6 is a side elevational view of a filter tank of this invention adapted to the process of the controlled atmosphere-solid waste disposal system of the present invention.

Referring now to the FIG. 6, a suitable filtering assembly is shown and identified by the numeral 49. This filter assembly 49 comprises an upstanding tank 50 having a substantially cone-shaped bottom portion 51 carried by a pedestal 52. The collector conduit 48 in communication with the evaporator-dehydrator assembly 26 is disposed in the sidewall of the tank 50. A plurality of rotating filter collector bars 53 are distally disposed in the tank 50. Particulate matter is collected on bars 53 and then discharged from the bars 53 in response to rotation of the bars 53, so that a slurry of semisolids tends to be collected on a filter 54 disposed above the cone portion 51. An exitway 55 tends to conduct the slurry out of the tank 50, while water runs through the filter 54 into the cone portion 51. A water dishcarge 56 is provided at the lowermost portion of the cone 51 to conduct filtered water from the tank.

Figure 7:
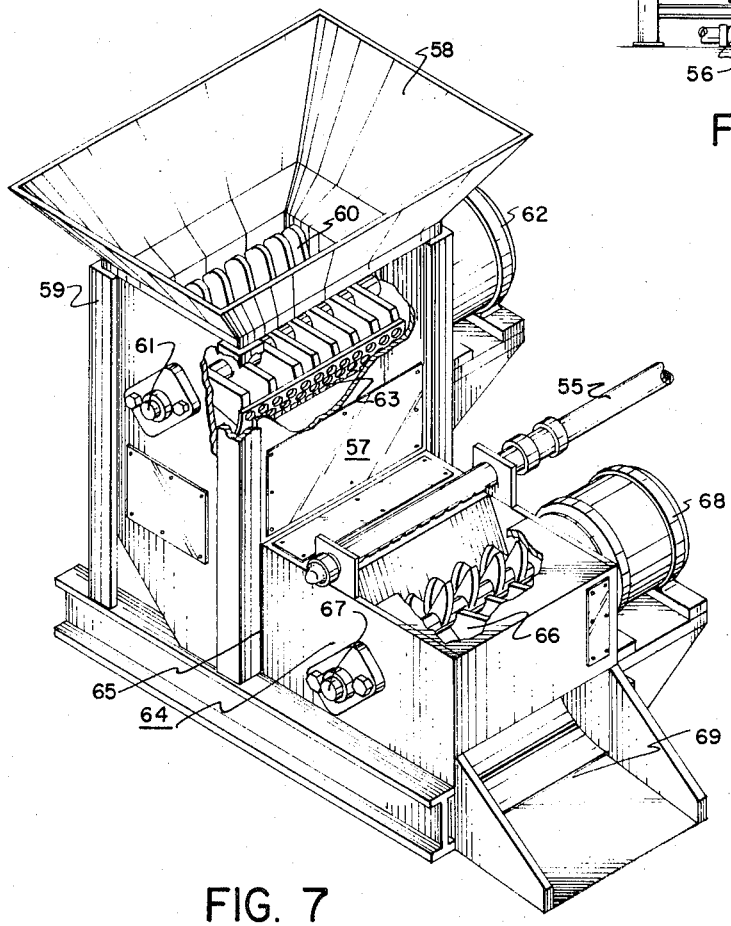
FIG. 7 is a perspective view of a combination mixer-grinder apparatus adapted for use in the process of the invention.

Referring now to the FIG. 7, the grinding-mixing apparatus of this invention generally identified by the numeral 57 is shown to advantage. Material from the evaporator-dehydrator assembly 26 is received into a hopper 58 carried by the grinding-mixing apparatus 57. The grinder 57 comprises the hopper 58 carried on a housing 59; a multiplicity of hammer-like blades 60 mounted on a shaft 61 journaled for rotation in the housing 59, and driven by a suitable means, such as motor 62; a screen 63 spaced circumferentially adjacent the lowermost terminal edge of the blades 60; and a discharge-mixer assembly 64 juxtapositioned to an exitway 65 at the lowermost portion of the housing 59. Waste material in the hopper 58 is picked up by the blades 60 and driven with substantial force to impinge the screen 63 in response to the rotation of the blades 60 on the shaft 61. At the same time, the blades 60 tend to grind the waste material. When the material is ground to a size smaller than the openings in the screen 63, the material may pass therethrough and into the discharge-mixing assembly 64 to be carried out of the grinder 57 into the discharge-mixing assembly 64. It is to be understood that glass, nonferrous metals, paper, and the like are included in the waste material mass.

The slurry conduit 55 in communication with the filter assembly 49 discharges the slurry into the mixing assembly 64. The discharge-mixing assembly 64 is provided with a plurality of paddles 66 carried on a shaft 67 journaled for rotation in the discharge-mixing assembly 64 where the slurry is mixed with the waste material in response to rotation of the paddles 66. The paddles 66 and the shaft 67 may be driven by a motor 68. The discharge-mixing assembly 64 is provided with an exitway 69 to discharge the mixed waste material therefrom.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I Claim:

1. A method of converting solid waste into a spreadable grainsized soil conditioner material, comprising the steps of:

selectively segregating processable waste materials from a collected solid waste mass;

shredding said prcessable materials;

heating said shredded processable materials at a temperature between 400° C. and 1,300° C. and in an atmosphere of high ambient moisture content so as to remove condensate and moisture from said processable materials while preventing the incineration thereof; and grinding the resultant material into a grainsized spreadable mass.

2. In a controlled atmosphere-solid waste disposal system the combination of a sorting table, shredding means mounted at one of the terminal ends of said table operable to shred selected waste materials, an evaporating-dehydrating means juxtapositioned adjacent said shredding means, said evaporating-dehydrating means including a feeder assembly, an enclosed housing, a conveyor rectilinearly disposed in said housing being coextensive in length therewith, said conveyor being of a transverse width less than said housing to provide opening at opposite sides of said conveyor and said enclosed housing, said conveyor being distally disposed in said housing above a bottom wall provided in said enclosed housing, said housing having a multiplicity of convex cooling chamber-reflector plate assemblies forming the uppermost wall of said enclosed housing, a heating means disposed in said housing between said cooling chamber-reflector plate assemblies and said conveyor, a multiplicity of pairs of water misting means disposed in said housing at opposite sides and distally below said conveyor, said housing being operable to cause moisture to condense and condensate be collected in said housing, grinding means juxtapositioned at the terminal end of said evaporating-dehydrating means opposite said shredding means.

* * * * *